(12) United States Patent
Shen et al.

(10) Patent No.: US 12,062,115 B2
(45) Date of Patent: Aug. 13, 2024

(54) METHOD AND APPARATUS FOR TEXT EFFECT PROCESSING

(71) Applicant: BEIJING BYTEDANCE NETWORK TECHNOLOGY CO., LTD., Beijing (CN)

(72) Inventors: Yanhao Shen, Beijing (CN); Guangyao Ni, Beijing (CN); Hui Yang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 70 days.

(21) Appl. No.: 17/631,888

(22) PCT Filed: Jul. 29, 2020

(86) PCT No.: PCT/CN2020/105440
§ 371 (c)(1),
(2) Date: Jan. 31, 2022

(87) PCT Pub. No.: WO2021/018179
PCT Pub. Date: Feb. 4, 2021

(65) Prior Publication Data
US 2022/0292733 A1    Sep. 15, 2022

(30) Foreign Application Priority Data
Aug. 1, 2019   (CN) .......................... 201910709131.X (51) Int. Cl.
*G09G 5/00* (2006.01)
*G06T 11/00* (2006.01)

(52) U.S. Cl.
CPC .................................. *G06T 11/001* (2013.01)

(58) Field of Classification Search
CPC ...... G06T 15/04; G06T 11/001; G06T 15/005; G06T 1/60; G09G 5/363
(Continued)

(56) References Cited

U.S. PATENT DOCUMENTS

| 5,940,080 A | 8/1999 | Ruehle et al. |
| 2012/0185905 A1* | 7/2012 | Kelley ............... H04N 21/8153 348/E9.055 |

(Continued)

FOREIGN PATENT DOCUMENTS

| CN | 102122502 A | 7/2011 |
| CN | 103337089 A | 10/2013 |

(Continued)

OTHER PUBLICATIONS

International Patent Application No. PCT/CN2020/105440; Int'l Search Report; dated Oct. 28, 2020; 2 pages.

(Continued)

*Primary Examiner* — Gordon G Liu
(74) *Attorney, Agent, or Firm* — BakerHostetler (57) ABSTRACT

A method and an apparatus for text effect processing, an electronic device, and a computer readable storage medium. The method comprises: sending to a server a request to acquire a text effect resource, the text effect resource being used to implement a display effect of text associated with multimedia; receiving a text effect resource sent by the server; and on the basis of the text effect resource, performing color-separated effect processing on text, causing text of different color components to be synchronously and dynamically displayed on a terminal screen, following playback progress of the multimedia.

12 Claims, 3 Drawing Sheets

(58) Field of Classification Search
USPC .......................................................... 345/582
See application file for complete search history.

(56) References Cited

U.S. PATENT DOCUMENTS

| | | | | |
|---|---|---|---|---|
| 2014/0193047 | A1* | 7/2014 | Grosz | G06Q 10/10 |
| | | | | 382/118 |
| 2017/0060365 | A1* | 3/2017 | VanBlon | G06F 40/30 |
| 2018/0189992 | A1* | 7/2018 | Pelissier | G06F 16/40 |

FOREIGN PATENT DOCUMENTS

| | | |
|---|---|---|
| CN | 107943964 A | 4/2018 |
| CN | 108269233 A | 7/2018 |
| CN | 109933751 A | 6/2019 |

OTHER PUBLICATIONS

"How does PS design the font of Douyin effect? How to make PS Douyin font effect"; https://www.jb51.net/photoshop/610046.html; JB51.Net Inc.; ©2006-2022; accessed Jan. 27, 2022; 7 pages.
"Tik Tok fault wind font is so simple"; http://www.itblw.com/graphic/acef3446a189ba75bb2b51e18ccfeb0.html; Jun. 2019; accessed Jan. 28, 2022; 6 pages.
"PS font example production: RGB color separation text effect"; https://jingyuan.baidu.com/article/3065b3b648967.abecff8a4fd.html; Baidu; Jun. 2018; accessed Sep. 11, 2023; 9 pages.

* cited by examiner

Figure 5

METHOD AND APPARATUS FOR TEXT EFFECT PROCESSING

The present application is the national phase application of PCT International Patent Application No. PCT/CN2020/105440, filed on Jul. 29, 2020 which claims the priority to Chinese Patent Application No. 201910709131.X, titled "METHOD AND APPARATUS FOR TEXT EFFECT PROCESSING", filed on Aug. 1, 2019 with the Chinese Patent Office, both of which are incorporated herein by reference in their entireties.

FIELD

The present disclosure relates to the technical field of image processing, and in particular to a method and an apparatus for text effect processing, and a computer readable storage medium.

BACKGROUND

For text design, what is often mentioned in conventional user interface design is the font paradigm, focusing on the shapes of the texts. Text effects are rarely mentioned. However, with the popularity of simple design, if the texts can be "moved", a single graphic page will immediately "live", thereby achieving a special user visual experience.

According to the conventional technology, a version of application corresponds to a type of text effect, that is, a determined version of application corresponds to a determined type of text effect. For example, a fixed type of text effect is included in a current version of application, and other new text effects cannot be added. New text effects can be added in the application only by updating the version of the application, which is very inflexible.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

According to the present disclosure, a method for text effect processing is provided to at least partially solve the technical problem of inflexible text effects in the conventional technology. In addition, an apparatus for text effect processing, a hardware device for text effect processing, a computer readable storage medium, and a terminal for text effect processing are further provided.

To achieve the above objectives, a method for text effect processing is provided according to an aspect of the present disclosure. The method includes: transmitting a request for obtaining a text effect resource to a server, where the text effect resource is used for realizing a display effect of texts associated with a multimedia; receiving the text effect resource from the server; and performing color separation effect processing on the texts based on the text effect resource to synchronously and dynamically display the texts having different color components on a screen of a terminal with a playback progress of the multimedia.

To achieve the above objectives, a method for text effect processing is provided according to an aspect of the present disclosure. The method includes: receiving a request for obtaining a text effect resource from a client, where the text effect resource is used for realizing a display effect of texts associated with a multimedia; and transmitting the text effect resource to the client, where the client performs color separation effect processing on the texts based on the text effect resource to synchronously and dynamically display the texts having different color components on a screen of a terminal with a playback progress of the multimedia.

To achieve the above objectives, an apparatus for text effect processing is provided according to an aspect of the present disclosure. The apparatus includes a request transmission module, a resource reception module, and an effect display module. The request transmission module is configured to transmit a request for obtaining a text effect resource to a server, where the text effect resource is used for realizing a display effect of texts associated with a multimedia. The resource reception module is configured to receive the text effect resource from the server. The effect display module is configured to perform color separation effect processing on the texts based on the text effect resource to synchronously and dynamically display the texts having different color components on a screen of a terminal with a playback progress of the multimedia.

To achieve the above objectives, an apparatus for text effect processing is provided according to an aspect of the present disclosure. The apparatus includes a request reception module and a resource transmission module. The request reception module is configured to receive a request for obtaining a text effect resource from a client, where the text effect resource is used for realizing a display effect of texts associated with a multimedia. The resource transmission module is configured to transmit the text effect resource to the client, where the client performs color separation effect processing on the texts based on the text effect resource to synchronously and dynamically display the texts having different color components on a screen of a terminal with a playback progress of the multimedia.

To achieve the above objectives, an electronic device is provided according to an aspect of the present disclosure. The electronic device includes a memory and a processor. The memory stores non-transitory computer readable instructions. The processor is configured to perform, when executing the computer readable instructions, any of the methods for text effect processing described above.

To achieve the above objectives, a computer readable storage medium is provided according to an aspect of the present disclosure. The computer readable storage medium stores non-transitory computer readable instructions. The non-transitory computer readable instructions, when executed by a computer, cause the computer to perform any of the methods for text effect processing described above.

To achieve the above objectives, a terminal for text effect processing is provided according to another aspect of the present disclosure. The terminal for text effect processing includes any of the apparatuses for text effect processing described above.

In the embodiments of the present disclosure, the text effect resource is obtained from the server, and color separation effect processing is performed on the texts based on the text effect resource to synchronously and dynamically display the texts having different color components on a screen of a terminal with a playback progress of the multimedia. According to the present disclosure, the text effects resource can be obtained without updating the client, thereby using the text effects more flexibly.

The above description is merely an overview of the technical solutions of the present disclosure. Some preferred embodiments are described hereinafter in conjunction with drawings in order for a clearer understanding of the technical means of the present disclosure to implement the technical solutions, and to make the above and other objectives, features and advantages of the present disclosure clearer and easier to understand.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

First Embodiment

Figure 1:
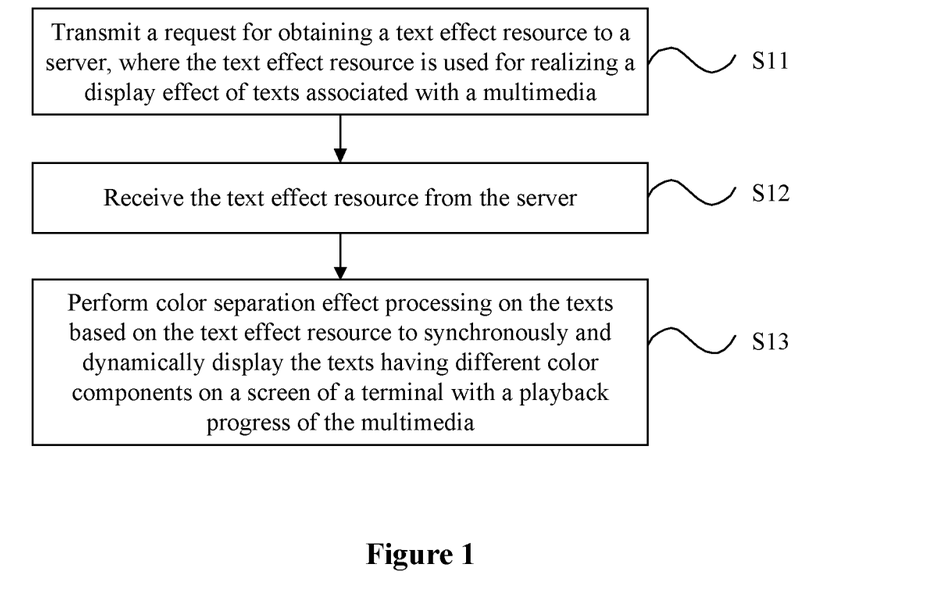
FIG. 1 is a flow chart of a method for text effect processing according to an embodiment of the present disclosure.

To solve the technical problem of inflexible text effect in the conventional technology, a method for text effect processing is provided according to an embodiment of the present disclosure. As shown in FIG. 1, the method for text effect processing includes the following steps S11 to S13.

In step S11, a request for obtaining a text effect resource is transmitted to a server, where the text effect resource is used for realizing a display effect of texts associated with a multimedia.

In the embodiment, the execution subject is a client installed on a terminal, for example, the execution subject may be a short video application or a music playing software. The terminal may be a mobile terminal (for example, a smart phone and a tablet computer) or a fixed terminal (for example, a desktop computer).

The multimedia may be a video, and the texts associated with the multimedia are the lines. The multimedia may be music, and the texts associated with the multimedia are lyrics.

The display effect may include zooming in the texts, zooming out the texts, gradually disappearing the texts from the screen of the terminal, gradually displaying the texts on the screen of the terminal, and the like.

Specifically, a multimedia option and/or a text effect resource option may be provided in an application interface of the client. For example, a multimedia list and/or a text effect resource list may be provided. The multimedia list may include multiple multimedia names, such as video names or music names. The text effect resource list may include effect information, such as zooming in or zooming out. With the multimedia option and/or the text effect resource option, the user may select a multimedia and/or a text effect resource on the client according to a requirement. Then, the multimedia and the texts associated with the multimedia may be obtained locally, or a request for obtaining a text effect resource may be transmitted to a server and the multimedia and the texts associated with the multimedia, such as music and lyrics corresponding to the music, are received from the server.

In step S12, the text effect resource is received from the server.

The server may be a third-party server for storing text effect resources. Alternatively, the server may be an application server corresponding to the client. The application server stores multimedia and texts associated with the multimedia in addition to storing the text effect resources.

In step S13, color separation effect processing is performed on the texts based on the text effect resource to synchronously and dynamically display the texts having different color components on a screen of a terminal with a playback progress of the multimedia.

Specifically, taking the multimedia as music and lyrics as an example, color separation effect processing is performed on the lyrics based on the text effect resource from the server. During the playing of the music, the lyrics having different color components are synchronously and dynamically displayed on a screen of a terminal with the playing of the music.

In the embodiment, the text effect resource is obtained from the server, and color separation effect processing is performed on the texts based on the text effect resource to synchronously and dynamically display the texts having different color components on the screen of the terminal with the playback progress of the multimedia. According to the present disclosure, the text effects resource can be obtained without updating the client, thereby using the text effects more flexibly.

In an embodiment, the step S13 includes the following steps S131 to S133.

In step S131, a time stamp corresponding to the playback progress of the multimedia and texts corresponding to the time stamp are obtained.

The time stamp represents a time period from an initial playback time instant to a current playback time instant.

Specifically, a corresponding relationship between the time stamp and the texts may be predetermined, then a time stamp corresponding to the playback progress of the multimedia is determined, and then the texts corresponding to the time stamp is obtained.

In step S132, color separation effect processing is performed on the texts corresponding to the time stamp based on the text effect resource to synchronously and dynamically display the texts having different color components on the screen of the terminal with the playback progress of the multimedia.

Specifically, color separation effect processing is performed the texts corresponding to each of the time stamps in the playback process of the multimedia based on the text effect resource, so that the texts having different color components are synchronously and dynamically displayed on the screen of the terminal with the playback progress of the multimedia.

In an embodiment, the step S132 includes the following steps S1321 to S1324.

In step S1321, the texts corresponding to the time stamp is typeset based on a typesetting parameter in the text effect resource, and generating a bitmap.

The text effect resource includes the typesetting parameter.

The typesetting parameter includes font, font size, font style, color, shadow, underline and the like.

The bitmap is composed of the pixels of the texts. The pixels are the smallest information units of the bitmap and are stored in an image grid. Each of the pixels has a position and a color value. The information, such as a position of a pixel on the screen of the terminal and a color of the pixel, of each of the pixels of the texts are recorded in the order from left to right and top to bottom.

In step S1322, the bitmap is transmitted to an image processor of the terminal to obtain a texture corresponding to the texts.

The texture includes the gray distribution of the pixels included in the texts and the gray distribution of the spatial neighborhood around the text.

In step S1323, an offset direction and an offset distance of each of color components in the texture are determined based on the time stamp.

The supported image format includes a RGB (Red Green Blue) image format, a CMY (Cyan Magenta Yellow) image format, an HSV (Hue Saturation Value) image format, an HIS (Hue Intensity Saturation) image format, and an Lab image format. L represents brightness, a represents a color channel, and b represents a color channel. The colors included in a range from dark green (low brightness) to gray (medium brightness) to bright pink (high brightness). The colors included in b range from bright blue (low brightness) to gray (medium brightness) to yellow (high brightness).

Specifically, an image format may be selected for display. For example, for the RGB image format, the corresponding color components include red, green, and blue; for the HSV image format or the HIS image format, the corresponding color components include hue, saturation and lightness; and for the Lab image format, the corresponding color components include brightness L, colors in a, and colors in b.

In step S1324, the texture is rendered by the image processor, and for each of the color components, texts corresponding to the color component are offset by the offset distance of the color component along the offset direction of the color component.

Specifically, taking the RGB image format as an example, offset directions of RGB channels may be obtained by using a random function. Then, each of the RGB channels is offset by a distance along the offset direction of RGB channel.

In an embodiment, the method further includes the following steps S14 and S15.

In step S14, a local script program is run based on a script file in the text effect resource.

In step S15, effect processing is performed on the texts based on the script program to synchronously and dynamically display the texts on the screen of the terminal with the playback progress of the multimedia.

Specifically, the script program may be written in advance and is configured in the client, and the script text corresponding to the script program is included in the text effect resource. After receiving the text effect resource from the server, color separation effect processing is performed on the texts by running the script program, so that the texts having different color components are synchronously and dynamically displayed on the screen of the terminal with the playback progress of the multimedia.

Second Embodiment

Figure 2:
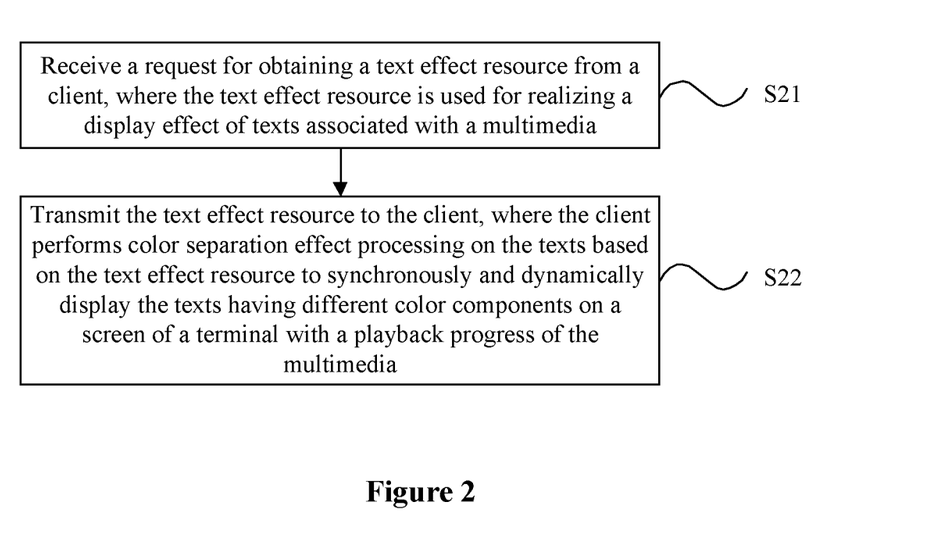
FIG. 2 is a flow chart of a method for text effect processing according to an embodiment of the present disclosure.

To solve the technical problem of inflexible text effect in the conventional technology, a method for text effect processing is provided according to an embodiment of the present disclosure. As shown in FIG. 2, the method for text effect processing includes the following steps S21 and S22.

In step S21, a request for obtaining a text effect resource is received from a client, where the text effect resource is used for realizing a display effect of texts associated with a multimedia.

In step S22, the text effect resource is transmitted to the client. The client performs color separation effect processing on the texts based on the text effect resource to synchronously and dynamically display the texts having different color components on a screen of a terminal with a playback progress of the multimedia.

In the embodiment, the execution subject is the server. Explanations and implementations of the terms in the embodiment may refer to the first embodiment above, which are repeated herein.

In the embodiment, the text effect resource is transmitted to the client, and the client performs color separation effect processing on the texts based on the text effect resource to synchronously and dynamically display the texts having different color components on a screen of a terminal with a playback progress of the multimedia. According to the present disclosure, the text effects resource can be obtained without updating the client, thereby using the text effects more flexibly.

It should be understood by those skilled in the art that, based on the above embodiments, obvious modifications (for example, a combination of the listed modes) or equivalent substitutions may be made.

Although the steps of the method for text effect processing in the embodiments are described in the above order, those skilled in the art should understand that the steps according to the embodiments of the present disclosure are not necessarily executed in the above order, and they may be performed in a reversed, parallel, interleaved manner or other orders. Besides, on the basis of the above steps, those skilled in the art may add other steps. These obvious modifications or equivalents shall fall within the protection scope of the present disclosure, and are not repeated hereinafter.

The apparatus embodiments according to the present disclosure are described below. The apparatus embodiments can perform the steps of the method embodiments of the present disclosure. For ease of description, only the parts related to the embodiments of the present disclosure are shown. For specific technical details that are not disclosed, one may refer to the method embodiments of the present disclosure.

Third Embodiment

Figure 3:
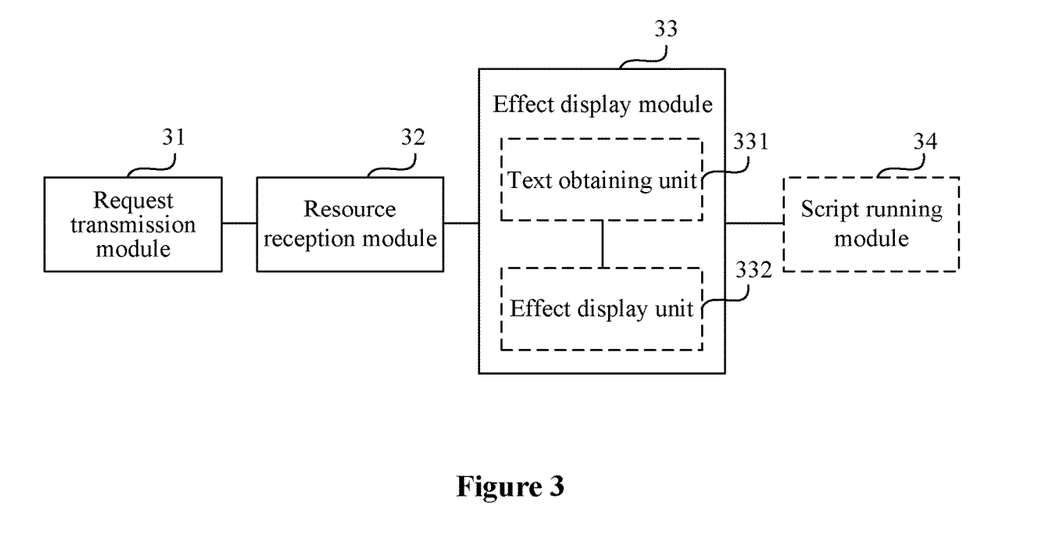
FIG. 3 is a schematic structural diagram of an apparatus for text effect processing according to an embodiment of the present disclosure.

To solve the technical problem of inflexible text effect in the conventional technology, an apparatus for text effect processing is provided according to an embodiment of the present disclosure. The apparatus is configured to perform the steps of the method text effect processing according to the first embodiment. As shown in FIG. 3, the apparatus includes a request transmission module 31, a resource reception module 32, and an effect display module 33.

The request transmission module 31 is configured to transmit a request for obtaining a text effect resource to a server, where the text effect resource is used for realizing a display effect of texts associated with a multimedia.

The resource reception module 32 is configured to receive the text effect resource from the server.

The effect display module 33 is configured to perform color separation effect processing on the texts based on the text effect resource to synchronously and dynamically display the texts having different color components on a screen of a terminal with a playback progress of the multimedia.

In a further embodiment, the effect display module 33 includes: a text obtaining unit 331 and an effect display unit 332.

The text obtaining unit 331 is configured to obtain a time stamp corresponding to the playback progress of the multimedia and texts corresponding to the time stamp.

The effect display unit 332 is configured to perform color separation effect processing on the texts corresponding to the time stamp based on the text effect resource to synchronously and dynamically display the texts having different color components on the screen of the terminal with the playback progress of the multimedia.

In a further embodiment, the effect display unit 332 is configured to: typeset the texts corresponding to the time stamp based on a typesetting parameter in the text effect resource and generate a bitmap; transmit the bitmap to an image processor of the terminal to obtain a texture corresponding to the texts; determine an offset direction and an offset distance of each of color components in the texture based on the time stamp; and render the texture by the image processor, and offset, for each of the color components, texts corresponding to the color component by the offset distance of the color component along the offset direction of the color component.

In a further embodiment, the apparatus includes: a script running module 34. The script running module 34 is configured to run a local script program based on a script file in the text effect resource; and perform effect processing on the texts based on the script program.

For detailed descriptions of the operation principles and achieved technical effects of the apparatus for text effect processing in the embodiments, one may refer to the descriptions of the method for text effect processing in the above embodiments, which are not repeated herein.

Fourth Embodiment

Figure 4:
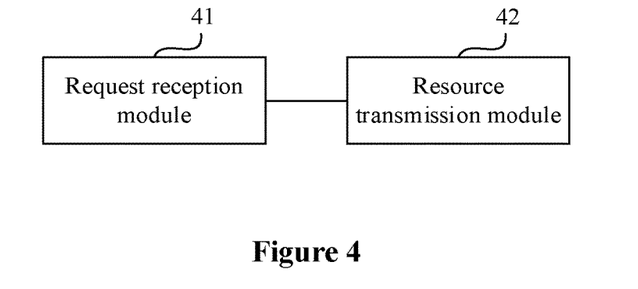
FIG. 4 is a schematic structural diagram of an apparatus for text effect processing according to an embodiment of the present disclosure.

To solve the technical problem of inflexible text effect in the conventional technology, an apparatus for text effect processing is provided according to an embodiment of the present disclosure. The apparatus is configured to perform the steps of the method text effect processing according to the second embodiment. As shown in FIG. 4, the apparatus includes a request reception module 41 and a resource transmission module 42.

The request reception module 41 is configured to receive a request for obtaining a text effect resource from a client, where the text effect resource is used for realizing a display effect of texts associated with a multimedia.

The resource transmission module 42 is configured to transmit the text effect resource to the client. The client performs color separation effect processing on the texts based on the text effect resource to synchronously and dynamically display the texts having different color components on a screen of a terminal with a playback progress of the multimedia.

For detailed descriptions of the operation principles and achieved technical effects of the apparatus for text effect processing in the embodiments, one may refer to the descriptions of the method for text effect processing in the above embodiments, which are not repeated herein.

Fifth Embodiment

Figure 5:
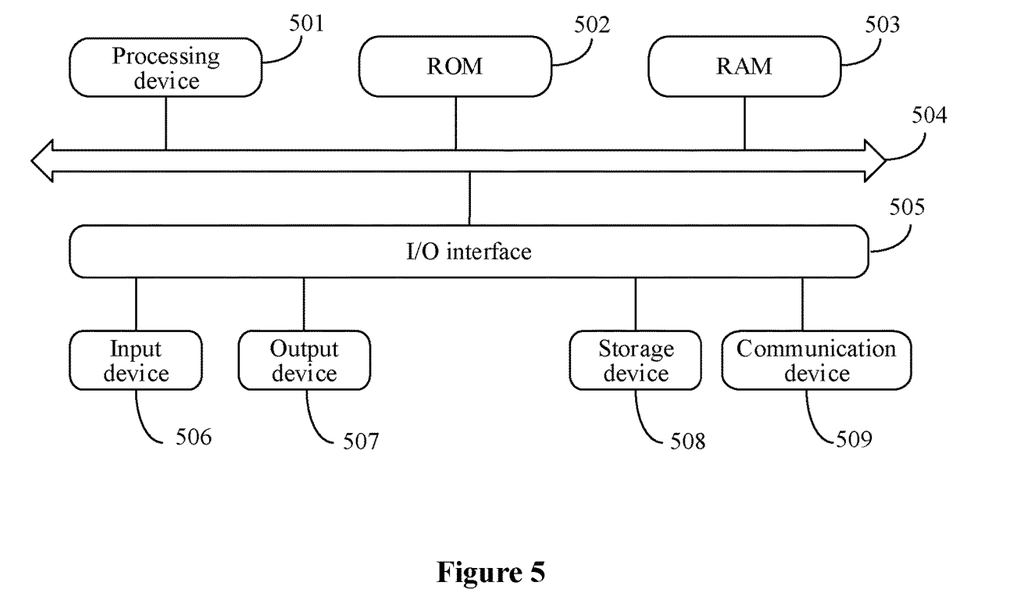
FIG. 5 is a schematic structural diagram of an electronic device according to an embodiment of the present disclosure.

FIG. 5 shows a schematic structural diagram of an electronic device 500 suitable for implementing the embodiments of the present disclosure. The terminal devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players), vehicle-mounted terminals (such as in-vehicle navigation terminals) and the like, and fixed terminals such as digital TVs, desktop computers, and the like. The electronic device shown in FIG. 5 is only exemplary, and should not indicate any limitation to the function and application scope of the embodiments of the present disclosure.

As shown in FIG. 5, the electronic device 500 may include a processing device 501, such as a central processing unit (CPU) or a graphics processor, which may execute various operations and processing through a program stored in a Read Only Memory (ROM) 502 or a program loaded from the storage device 508 into a Random Access Memory (RAM) 503. The RAM 503 is further configured to store various programs and data required by the electronic device 500. The processing device 501, the ROM 502 and the RAM 503 are connected to each other through a bus 504. An Input/output (I/O) interface 505 is also connected to the bus 504.

Generally, the I/O interface 505 may be connected to: an input device 506, such as a touch screen, a touch panel, a keyboard, a mouse, a camera, a microphone, an accelerometer, and a gyroscope; an output device 507, such as a liquid crystal display (LCD), a speaker, and a vibrator; a storage device 506 such as a magnetic tape and a hard disk; and a communication device 509. The communication device 509 enables wireless or wired communication between the electronic device 500 and other devices for data exchanging. Although FIG. 5 shows an electronic device 500 having various components, it should be understood that the illustrated components are not necessarily required to all be implemented or included. Alternatively, more or fewer components may be implemented or included.

Particularly, according to an embodiment of the present disclosure, the process described above in conjunction with flow charts may be implemented as a computer program. For example, a computer program product is further provided as an embodiment in the present disclosure, including a computer program carried on a non-transitory computer readable medium. The computer program includes program code for performing the method shown in the flow charts. In the embodiment, the computer program may be downloaded and installed from the network via the communication device 509, or installed from the storage device 506, or installed from the ROM 502. When the computer program is executed by the processing device 501, the above-mentioned functions defined in the method according to the embodiment of the present disclosure are performed.

It is to be noted that, the computer readable medium mentioned herein may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the embodiment of the present disclosure, the computer readable storage medium may be any tangible medium containing or storing a program, and the program may be used by or in combination with an instruction execution system, apparatus, or device. In the embodiment of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable medium may be incorporated in the electronic device, or may exist alone without being assembled into the electronic device.

The computer readable medium carries one or more programs. The one or more programs, when being executed by the electronic device, cause the electronic to: transmit a request for obtaining a text effect resource to a server, where the text effect resource is used for realizing a display effect of texts associated with a multimedia; receive the text effect resource from the server; and perform color separation effect processing on the texts based on the text effect resource to synchronously and dynamically display the texts having different color components on a screen of a terminal with a playback progress of the multimedia.

Computer program code for performing operations of the present disclosure may be written in one or more programming languages, or a combination of the foregoing, and the programming language includes object oriented programming languages, such as Java, Smalltalk, and C++, also includes conventional procedural programming languages, such as "C" language or similar programming languages. The program code may be executed entirely on a user's computer, or be executed partly on the user's computer, or be executed as a stand-alone software package, or be executed partly on the user's computer and partly on a remote computer, or be executed entirely on the remote computer or server. In the case that the execution of the program code involves a remote computer, the remote computer can be connected to a user's computer via any kind of network, including a local area network (LAN) or a wide area network (WAN), or can be connected to an external computer (for example, via an Internet providing by an Internet service provider).

The flow charts and schematic diagrams in the Figures shows the architecture, functionality and operation of possible implementations of the products of system, method and computer program provided according to the embodiments of the present disclosure. Each block in the flow charts or schematic diagrams can represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

The units mentioned in the description of the embodiments of the present disclosure may be implemented by means of software, or otherwise by means of hardware. In some circumstances, the name of a unit does not constitute a limitation on the unit itself.

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the present disclosure, a machine-readable medium may be a tangible medium, which may contain or store a program used by the instruction execution system, apparatus, or device or a program used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

According to one or more embodiments of the present disclosure, a method for text effect processing is provided. The method includes: transmitting a request for obtaining a text effect resource to a server, where the text effect resource is used for realizing a display effect of texts associated with a multimedia; receiving the text effect resource from the server; and performing color separation effect processing on the texts based on the text effect resource to synchronously and dynamically display the texts having different color components on a screen of a terminal with a playback progress of the multimedia.

In a further embodiment, the performing color separation effect processing on the texts based on the text effect resource to synchronously and dynamically display the texts having different color components on a screen of a terminal with a playback progress of the multimedia includes: obtaining a time stamp corresponding to the playback progress of the multimedia and texts corresponding to the time stamp; and performing color separation effect processing on the texts corresponding to the time stamp based on the text effect resource to synchronously and dynamically display the texts having different color components on the screen of the terminal with the playback progress of the multimedia.

In a further embodiment, the performing color separation effect processing on the texts based on the text effect resource to synchronously and dynamically display the texts having different color components on a screen of a terminal with a playback progress of the multimedia includes: typesetting the texts corresponding to the time stamp based on a typesetting parameter in the text effect resource, and generating a bitmap; transmitting the bitmap to an image processor of the terminal to obtain a texture corresponding to the texts; determining an offset direction and an offset distance of each of color components in the texture based on the time stamp; and rendering the texture by the image processor, and offsetting, for each of the color components, texts corresponding to the color component by the offset distance of the color component along the offset direction of the color component.

In a further embodiment, the method further includes: running a local script program based on a script file in the text effect resource; and performing color separation effect processing on the texts based on the script program.

According to one or more embodiments of the present disclosure, a method for text effect processing is provided. The method includes: receiving a request for obtaining a text effect resource from a client, where the text effect resource is used for realizing a display effect of texts associated with a multimedia; and transmitting the text effect resource to the client, where the client performs color separation effect processing on the texts based on the text effect resource to synchronously and dynamically display the texts having different color components on a screen of a terminal with a playback progress of the multimedia.

According to one or more embodiments of the present disclosure, an apparatus for text effect processing is provided. The apparatus includes: a request transmission module configured to transmit a request for obtaining a text effect resource to a server, where the text effect resource is used for realizing a display effect of texts associated with a multimedia; a resource reception module configured to receive the text effect resource from the server; and an effect display module configured to perform color separation effect processing on the texts based on the text effect resource to synchronously and dynamically display the texts having different color components on a screen of a terminal with a playback progress of the multimedia.

In a further embodiment, the effect display module includes: a text obtaining unit configured to obtain a time stamp corresponding to the playback progress of the multimedia and texts corresponding to the time stamp; and an effect display unit configured to perform color separation effect processing on the texts corresponding to the time stamp based on the text effect resource to synchronously and dynamically display the texts having different color components on the screen of the terminal with the playback progress of the multimedia.

In a further embodiment, the effect display unit is configured to: typeset the texts corresponding to the time stamp based on a typesetting parameter in the text effect resource and generate a bitmap; transmit the bitmap to an image processor of the terminal to obtain a texture corresponding to the texts; determine an offset direction and an offset distance of each of color components in the texture based on the time stamp; and render the texture by the image processor, and offset, for each of the color components, texts corresponding to the color component by the offset distance of the color component along the offset direction of the color component.

In a further embodiment, the apparatus includes: a script running module. The script running module is configured to run a local script program based on a script file in the text effect resource; and perform color separation effect processing on the texts based on the script program.

According to one or more embodiments of the present disclosure, an apparatus for text effect processing is provided. The apparatus includes: a request reception module and a resource transmission module. The request reception module is configured to receive a request for obtaining a text effect resource from a client, where the text effect resource is used for realizing a display effect of texts associated with a multimedia. The resource transmission module is configured to transmit the text effect resource to the client. The client performs color separation effect processing on the texts based on the text effect resource to synchronously and dynamically display the texts having different color components on a screen of a terminal with a playback progress of the multimedia.

According to one or more embodiments of the present disclosure, an electronic device is provided. The electronic device includes: a memory and a processor. The memory stores non-transitory computer readable instructions. The processor is configured to perform, when executing the computer readable instructions, the method for text effect processing.

According to one or more embodiments of the present disclosure, a computer readable storage medium is provided. The computer readable storage medium stores non-transitory computer readable instructions. The non-transitory computer readable instructions, when executed by a computer, cause the computer to perform the method for text effect processing.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination.

Although the solutions according to the present disclosure have been described in language specific to structural features and/or logical actions of the method, it should be understood that the solutions defined in the appended claims are unnecessarily limited to the specific features or actions described above. The specific features and actions described above are merely exemplary forms of implementing the claims.

The invention claimed is:

1. A method for text effect processing, comprising:
transmitting a request for obtaining a text effect resource to a server, wherein the text effect resource is configured to implement a display effect of texts associated with a multimedia;
receiving the text effect resource from the server; and
synchronously and dynamically displaying the texts with different color components on a screen of a terminal during playing the multimedia according to a playback progress of the multimedia by performing color separation effect processing on the texts based on the text effect resource.

2. The method according to claim 1, wherein the performing color separation effect processing on the texts based on the text effect resource to synchronously and dynamically display the texts having different color components on a screen of a terminal with a playback progress of the multimedia comprises:
obtaining a time stamp corresponding to the playback progress of the multimedia and texts corresponding to the time stamp; and
performing color separation effect processing on the texts corresponding to the time stamp based on the text effect resource to synchronously and dynamically display the texts having different color components on the screen of the terminal with the playback progress of the multimedia.

3. The method according to claim 2, wherein the performing color separation effect processing on the texts based on the text effect resource to synchronously and dynamically display the texts having different color components on a screen of a terminal with a playback progress of the multimedia comprises:
typesetting the texts corresponding to the time stamp based on a typesetting parameter in the text effect resource, and generating a bitmap;
transmitting the bitmap to an image processor of the terminal to obtain a texture corresponding to the texts;
determining an offset direction and an offset distance of each of color components in the texture based on the time stamp; and
rendering the texture by the image processor, and offsetting, for each of the color components, texts corresponding to the color component by the offset distance of the color component along the offset direction of the color component.

4. The method according to claim 1, further comprising:
running a local script program based on a script file in the text effect resource; and
performing color separation effect processing on the texts based on the script program.

5. A non-transitory computer readable storage medium, storing non-transitory computer readable instructions, wherein
the non-transitory computer readable instructions, when executed by a computer, cause the computer to perform the method for text effect processing according to claim 1.

6. A method for text effect processing, comprising:
receiving a request for obtaining a text effect resource from a client, wherein the text effect resource is configured to implement a display effect of texts associated with a multimedia; and
transmitting the text effect resource to the client, wherein the client synchronously and dynamically displays the texts with different color components on a screen of a terminal during playing the multimedia according to a playback progress of the multimedia by performing color separation effect processing on the texts based on the text effect resource.

7. An apparatus for text effect processing, comprising:
at least one processor; and
at least one memory configured for storing at least one program, wherein when the at least one program is executed by the at least one processor, the at least one processor is caused to perform the method of claim 6.

8. A non-transitory computer readable storage medium, storing non-transitory computer readable instructions, wherein the non-transitory computer readable instructions, when executed by a computer, cause the computer to perform the method for text effect processing according to claim 6.

9. An apparatus for text effect processing, comprising:
at least one processor; and
at least one memory configured for storing at least one program, wherein when the at least one program is executed by the at least one processor, the at least one processor is caused to perform operations comprising:
transmitting a request for obtaining a text effect resource to a server, wherein the text effect resource is configured to implement a display effect of texts associated with a multimedia;
receiving the text effect resource from the server; and
synchronously and dynamically displaying the texts with different color components on a screen of a terminal during playing the multimedia according to a playback progress of the multimedia by performing color separation effect processing on the texts based on the text effect resource.

10. The apparatus according to claim 9, wherein the performing color separation effect processing on the texts based on the text effect resource to synchronously and dynamically display the texts having different color components on a screen of a terminal with a playback progress of the multimedia comprises:
   obtaining a time stamp corresponding to the playback progress of the multimedia and texts corresponding to the time stamp; and
   performing color separation effect processing on the texts corresponding to the time stamp based on the text effect resource to synchronously and dynamically display the texts having different color components on the screen of the terminal with the playback progress of the multimedia.

11. The apparatus according to claim 10, wherein the performing color separation effect processing on the texts based on the text effect resource to synchronously and dynamically display the texts having different color components on a screen of a terminal with a playback progress of the multimedia comprises:
   typesetting the texts corresponding to the time stamp based on a typesetting parameter in the text effect resource, and generating a bitmap;
   transmitting the bitmap to an image processor of the terminal to obtain a texture corresponding to the texts;
   determining an offset direction and an offset distance of each of color components in the texture based on the time stamp; and
   rendering the texture by the image processor, and offsetting, for each of the color components, texts corresponding to the color component by the offset distance of the color component along the offset direction of the color component.

12. The apparatus according to claim 9, wherein the at least one processor is further caused to perform operations of:
   running a local script program based on a script file in the text effect resource; and
   performing color separation effect processing on the texts based on the script program.

* * * * *